Dec. 5, 1961 W. A. CASTINE ET AL 3,011,246
EDGE ROLLER
Filed Sept. 15, 1958

INVENTOR.
WILLIAM A. CASTINE and
RICHARD J. HORNAK
BY
Oscar L. Spencer
ATTORNEY

3,011,246
EDGE ROLLER
William A. Castine, Jeannette, and Richard J. Hornak, Irwin, Pa., assignors to Pittsburgh Plate Glass Company, Allegheny County, Pa.
Filed Sept. 15, 1958, Ser. No. 761,131
3 Claims. (Cl. 29—116)

This application relates to the manufacture of laminated glass, and more particularly to apparatus for edge sealing the plastic interlayer to the sheets of glass after a prepressing operation.

In the manufacture of laminated glass, such as modern automobile windshields, a sheet of relatively thin plastic is placed between two sheets of glass which have been cut to the desired contour and bent to a desired shape. The plastic forms the interlayer and, after its placement between the sheets of glass, it is subsequently trimmed to the contour of the glass sheets. The assembly of glass and plastic is then subjected to a prepressing operation wherein the temperature of the assembly is raised and pressure applied thereto to initially adhere the plastic sheet to the glass sheets. This prepressed assembly is finally subjected to the final pressing operation, usually in an oil autoclave. At times, some portions of the plastic sheet adjacent the edge of the laminate, especially at the sharp bends, which characterize modern windshields, is not sealed to the glass after the prepressing operation, so that in the final pressing operation oil can enter the laminate. To avoid the entry of oil between the sheets of glass during the final pressing operation, any portions of the edge that are not sealed after prepressing are manually edge sealed. This edge sealing is accomplished immediately after prepressing by rolling and compressing the relatively hot interlayer edge, so as to force it between the glass sheets in sealing contact therewith. The edge sealing is performed by using a thin metal disc, known in the trade as an edge roller.

The prior art edge rollers consisted of relatively thin metal discs having annular hubs riveted to each side, the hub facilitating the handling of the discs. Central openings are provided in the discs and hubs for grasping by the operator's fingers. Such discs are relatively difficult to handle in that they must be rotated for best results and their integral construction prevents easy rotation in that they must be grasped in such a manner and with such pressure to allow free rotation. For safety while handling the prepressed glass sheets operators wear gloves, and the use of the prior art edge rollers causes extreme wear of the gloves requiring their frequent replacement. Also, being of integral construction, the entire assembly of disc and hubs must be replaced when the disc is worn or becomes damaged.

To avoid the shortcomings of the prior art edge rollers, we have devised an edge roller which is relatively easy to handle and use and which, because of its construction, allows the replacement of the disc when worn or damaged and the continued reuse of the other elements. Moreover, by using the edge roller of this invention the wear on the operator's gloves is materially reduced.

Therefore, the principal objective of this invention is the provision of an improved edge roller for use in the manufacture of laminated glass, such as bent automobile windshields.

This and other objects and features will become apparent from the following description when taken with the accompanying drawing, in which.

Figure 1:
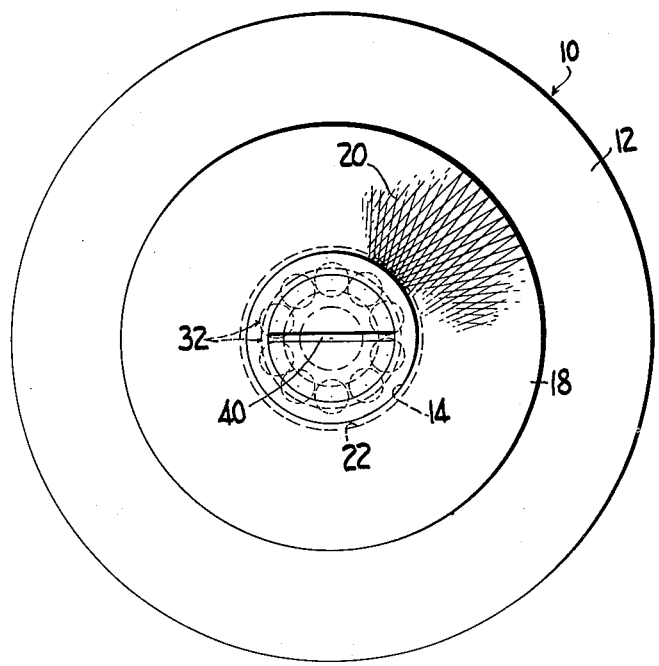
FIG. 1 is a side view of the edge roller of this invention.
Figure 2:
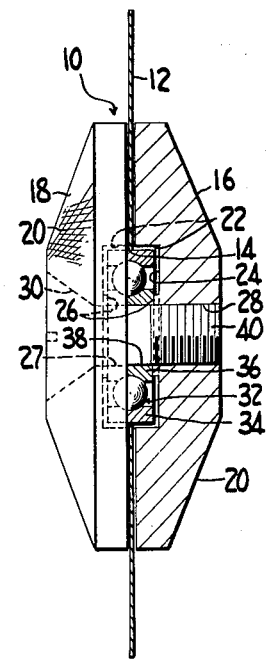
FIG. 2 is an edge view of the edge roller with parts in section.

Referring now to the drawing, there is illustrated the edge roller of this invention, generally identified as 10, which comprises a relatively thin and flexible metal disc 12 having a central opening 14 therethrough and preferably made of spring steel with a thickness of approximately 0.010 inch. Spaced from the sides of disc 12 are hub elements 16 and 18 of a diameter less than that of disc 12, each having a knurled or roughened outer surface 20 and a centrally located circular recess 22 with an outer annular portion 24 of greater depth than its central portion 26. Hub elements 16 and 18 are preferably constructed of metal, such as aluminum. Hub element 16 has a centrally located threaded opening 28 therethrough, and hub element 18 has a centrally located opening 27, the latter being provided with a tapered wall 30 for a portion of its length. An annular ball bearing assembly 32 is received within disc opening 14 and within hub recesses 22 with its outer race 34 of a diameter substantially equal to the diameter of opening 14 and its inner race 36 provided with its central opening 38 in substantial alignment with hub element openings 28 and 27. The terminal ends of inner race 36 are in contacting relationship with central portions 26 of recesses 22, thereby providing the spacing between hub parts 16 and 18 and disc 12. The bearing assembly 32 allows relative rotation between the disc 12 and hub parts 16 and 18. A flat head machine screw 40 is received in openings 28, 27 and 38 with its threads engaging the threaded opening 28 to retain the described parts in their assembled relationship. The length of screw 40 is such that it does not extend beyond hub elements 16 and 18.

Thus, the operator merely grasps hub elements 16 and 18 by the fingers of the gloved hand and places the disc in contact with the plastic between the glass. As he moves the assembly 10 over the area to be sealed, with the edge of disc 12 in contact with the plastic interlayer, the disc 12 rotates relative to hub elements 16 and 18, causing little or no wear to his glove. Upon wear or damage to disc 12, it is a simple matter to disassemble the roller assembly 10 by removing the screw 40, removing the damaged disc 12 and replacing the disc with a new one.

We claim:
1. A hand tool for edge sealing the plastic interlayer of a prepressed laminated glass article comprising, a relatively flexible disc having a thickness slightly less than that of a plastic interlayer, a central opening in the disc, a two part cylindrical sectioned hub of a diameter less than that of the disc and having a hub part slightly spaced from each side of the disc, said hub being hand grasped during use of said tool, an annular bearing assembly received within the disc opening allowing relative rotation between the hub parts and the disc and providing the spacing between the hub parts and the disc, and screw means to retain the apparatus in assembled relationship and allowing the disassembly of the apparatus for repair and replacement of the disc.

2. A hand tool for edge sealing the plastic interlayer of a prepressed laminated glass article comprising, a relatively flexible disc having a thickness slightly less than that of a plastic interlayer, a central opening in the disc, a two part cylindrical sectioned hub of a diameter less than that of the disc and having a hub part slightly spaced from each side of the disc, said hub being hand grasped during use of said tool, a circular recess in each hub part, bearing means received within the disc opening and the hub recesses allowing relative rotation between the hub parts and the disc and providing the spacing between the hub parts and the disc, means to retain the apparatus in assembled relationship and allowing the disassembly of the apparatus for repair and replacement of the disc.

3. A hand tool, for edge sealing the plastic interlayer of a prepressed laminated glass article comprising, a relatively flexible disc having a thickness slightly less than that of a plastic interlayer, a central opening in the disc, a two part cylindrical sectioned hub of a diameter less than that of the disc and having a hub part slightly spaced from each side of the disc, said hub being hand grasped during use of said tool, a circular recess in each hub part having an outer portion of greater depth than an inner portion, a central opening in each hub part, an annular bearing assembly received within the disc opening and the hub recesses with its outer race of substantially the same diameter as the disc opening and its inner race in contact with the inner portions of the hub recesses thereby allowing relative rotation between the hub parts and the disc and providing the spacing between the hub parts and the disc, and a screw received within the hub openings and passing through the annular bearing to retain the apparatus in assembled relationship and allowing the disassembly of the apparatus for repair and replacement of the disc.

References Cited in the file of this patent

UNITED STATES PATENTS

| | | |
|---|---|---|
| 1,754,969 | Spoor | Apr. 15, 1930 |
| 1,992,997 | Drake | Mar. 5, 1935 |
| 1,998,929 | Johnstone | Apr. 23, 1935 |
| 2,367,974 | Stocker | Jan. 23, 1945 |
| 2,712,852 | Carter | July 12, 1955 |